United States Patent
Kulkarni et al.

(10) Patent No.: US 11,501,026 B2
(45) Date of Patent: Nov. 15, 2022

(54) METHOD TO ENCRYPT THE DATA AT REST FOR DATA RESIDING ON KUBERNETES PERSISTENT VOLUMES

(71) Applicant: Avaya Management L.P., Santa Clara, CA (US)

(72) Inventors: Prasanna Kulkarni, Pune (IN); Nayana Teja Avatapalli, Eluru (IN)

(73) Assignee: Avaya Management L.P., Santa Clara, CA (US)

( * ) Notice: Subject to any disclaimer, the term of this patent is extended or adjusted under 35 U.S.C. 154(b) by 126 days.

(21) Appl. No.: 16/927,078

(22) Filed: Jul. 13, 2020

(65) Prior Publication Data
US 2022/0012373 A1    Jan. 13, 2022

(51) Int. Cl.
H04L 29/06 (2006.01)
G06F 21/79 (2013.01)
G06F 21/60 (2013.01)
H04L 9/32 (2006.01)

(52) U.S. Cl.
CPC ............ G06F 21/79 (2013.01); G06F 21/602 (2013.01)

(58) Field of Classification Search
CPC ............................... G06F 21/602; G06F 21/79
See application file for complete search history.

(56) References Cited

U.S. PATENT DOCUMENTS

| | | | | |
|---|---|---|---|---|
| 7,546,462 B2* | 6/2009 | Upton | ...................... | G06F 9/541 713/170 |
| 8,473,468 B2* | 6/2013 | Pace | ........................ | H04L 63/12 707/806 |
| 8,831,002 B2* | 9/2014 | Haserodt | ................. | H04L 65/80 370/392 |
| 9,575,735 B2* | 2/2017 | Baldera | ..................... | G06F 8/36 |
| 9,626,166 B1* | 4/2017 | Alewine | ............... | G06F 21/575 |
| 10,079,832 B1* | 9/2018 | Dearment | ................. | G06F 8/60 |
| 10,191,778 B1* | 1/2019 | Yang | ..................... | G06F 11/301 |
| 10,565,092 B2* | 2/2020 | Benes | ................. | G06F 11/0712 |
| 10,599,463 B2* | 3/2020 | Paithankar | .......... | G06F 9/45558 |
| 10,824,355 B2* | 11/2020 | Ahmed | ................. | G06F 3/0629 |
| 11,150,926 B2* | 10/2021 | Polig | ..................... | G06F 9/4552 |
| 11,343,247 B1* | 5/2022 | Ozarkar | .............. | H04L 63/0471 |
| 2008/0216049 A1* | 9/2008 | Fournies | ................. | G06F 9/465 717/100 |
| 2012/0297206 A1* | 11/2012 | Nord | ..................... | H04L 9/0822 713/193 |
| 2016/0057071 A1* | 2/2016 | Parikh | ..................... | H04L 41/50 709/226 |

(Continued)

OTHER PUBLICATIONS

U.S. Appl. No. 16/843,689, filed Apr. 8, 2020, Kulkarni et al.

(Continued)

*Primary Examiner* — Gary S Gracia
(74) *Attorney, Agent, or Firm* — Sheridan Ross P.C.

(57) ABSTRACT

When performing data encryption at rest of data residing on Kubernetes persistent volume, existing methods rely on storage provider's encryption capabilities, which instill limitations that hinder deployment. Accordingly, systems and methods are described that receive a Pod specification comprising a disk encryption request and automatically annotate the specification to include specifications for the disk encryption (e.g., secret, key, etc.) to mount a persistent volume having a disk encrypted according to the generated specification.

20 Claims, 11 Drawing Sheets

(56) References Cited

U.S. PATENT DOCUMENTS

| | | | |
|---|---|---|---|
| 2016/0241398 A1* | 8/2016 | Lewis | H04L 9/3234 |
| 2016/0359622 A1* | 12/2016 | Bunch | H04L 67/1097 |
| 2017/0041189 A1* | 2/2017 | Aswathanarayana | H04L 67/34 |
| 2017/0249472 A1 | 8/2017 | Levy et al. | |
| 2017/0279797 A1* | 9/2017 | Cross, Jr. | G06F 21/6218 |
| 2018/0109387 A1* | 4/2018 | Vyas | G06F 8/71 |
| 2018/0137032 A1* | 5/2018 | Tannous | G06F 11/3664 |
| 2018/0196608 A1* | 7/2018 | Ahmed | G06F 3/0622 |
| 2018/0246745 A1* | 8/2018 | Aronovich | G06F 9/45545 |
| 2018/0359338 A1* | 12/2018 | Vyas | H04L 67/34 |
| 2019/0018719 A1* | 1/2019 | Brin | G06F 9/547 |
| 2019/0044927 A1* | 2/2019 | Sood | G06F 21/57 |
| 2019/0097900 A1* | 3/2019 | Rodriguez | G06F 16/27 |
| 2019/0102280 A1* | 4/2019 | Caldato | G06F 9/505 |
| 2019/0179530 A1* | 6/2019 | Chen | G06F 3/0631 |
| 2020/0034127 A1* | 1/2020 | Burrowes | G06F 11/3006 |
| 2020/0042214 A1* | 2/2020 | Chen | G06F 3/0632 |
| 2020/0076685 A1* | 3/2020 | Vaidya | H04L 12/4641 |
| 2020/0174842 A1* | 6/2020 | Wang | H04L 67/63 |
| 2020/0220848 A1* | 7/2020 | Patwardhan | H04L 41/40 |
| 2020/0250006 A1* | 8/2020 | Parekh | H04L 67/1008 |
| 2020/0272487 A1* | 8/2020 | Polig | G06F 8/53 |
| 2020/0348954 A1* | 11/2020 | Banerjee | G06F 12/1009 |
| 2021/0319114 A1* | 10/2021 | Kulkarni | G06F 9/45533 |
| 2022/0222100 A1* | 7/2022 | Srivastava | G06F 21/602 |

OTHER PUBLICATIONS

"How vSAN Encryption Works," Vmware, Inc., last updated May 31, 2019, 2 pages [retrieved online from: docs.vmware.com/en/VMware-vSphere/6.7/com.vmware.vsphere.virtualsan.doc/GUID-37F9636A-7481-4486-AAA9-E0A1A49343A1.html].

Official Action for United Kingdom Patent Application No. GB2110056.5, dated Apr. 7, 2022 9 pages.

Official Action for India Patent Application No. 202114029484, dated Mar. 24, 2022 6 pages.

* cited by examiner

```
apiVersion: apps/v1
kind : Deployment
metadata :
    name : test-deployment-with-encrypted- pv
spec:
    replicas : 1
    selector:
        matchLabels :
            app: test-deployment
    template :
        metadata :
            labels :
                av-csp-disk-encryption-required/inject : "true"
            annotations:
av-csp-disk-encryption-pvc-info-1: "pvcName:apvc1,secret:pvc1-secret,fsType:ext3"
av-csp-disk-encryption-pvc-info-2: "pvcName:apvc2,secret:pvc2-secret,fsType:ext4"
av-csp-disk-encryption-mount-info-1: "containerName:container1,pvcName:apvc1,mountPath:/var/my-path1"
av-csp-disk-encryption-mount-info-2: "containerName:container2,pvcName:apvc2,mountPath:/var/my-path2"
```

*Fig. 4A*

```
spec:
    imagePullSecrets :                              ⌐400
    - name: "local-registry-secret"    ⌐410
    initContainers:
    - command:
        - sh
        - -c
        - <encryption script>
        name : encryptutil-init-container
        ...
        volumeMounts:                              ⌐412
        - mountPath: /av-csp-encrypted-disk
              mountPropagation: Bidirectional    ⌐413
              name: anchor-on-node
        - mountPath: /etc/av-csp-disk-encryption/config/pvc2-secret
              name: pvc2-secret
        - mountPath: /etc/av-csp-disk-encryption/config/pvc1-secret
              name : pvc1-secret
```

*Fig. 4B*

```
                                          ┌416                    ┌400
containers:
-┌name : container1────────────────┐
 │                                  │
       image : alpine
       command:
              - sh
              - -c
              - |
              # ! /usr /bin/env bash -e
              echo "Start container1"
              while true; do sleep 1000; done
       volumeMount:                         ┌418
       ┌- mountPath: /var/my-path1────┐  ┌420
       │mountProagation: HostToContainer│
       name : anchor-on-node                ┌422
       ┌subPath: apvc1────────────────┐
- name : container2
       image: busybox
       command:
              - sh
              - -c
              - |
              # ! /usr /bin/env bash -e
              echo "Start container2"
              while true; do sleep 1000; done
       volumeMounts:
              - mountPath : /var/my-path2
              mountPropagation: HostToContainer
              name : anchor-on-node
              subPath: apvc2
```

*Fig. 4C*

METHOD TO ENCRYPT THE DATA AT REST FOR DATA RESIDING ON KUBERNETES PERSISTENT VOLUMES

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for data encryption and particularly to Kubernetes-platform compliant initiation of encryption.

BACKGROUND

Kubernetes is a portable, extensible, open-source platform for managing containerized workloads and services, that facilitates both declarative configuration and automation. The Kubernetes documents, including specifications, may be found at www.kubernetes.io (collectively, "Kubernetes") and are incorporated herein by reference for all they teach as of the filing date of this application.

Software container orchestration, such as by implementing Kubernetes (often shortened to "K8s"), frequently launches and relocates application containers across nodes. A node can reside on physical or virtual hosts. Often block storage volumes that are mounted inside a particular container need to be mounted on a different node or need to be relocated to newly launched container. Kubernetes provides persistent volume (PV) mechanism to abstract how storage is made available and consumed by Pods and in turn by the Pods' containers.

In order to meet various regulatory compliances like General Data Protection Regulation (GDPR) and the California Consumer Privacy Act (CCPA), or to otherwise support data security, the data residing on the PV (on the underlying storage hardware or "disk") must be encrypted at rest.

When utilizing Kubernetes persistent volumes, disk encryption can be achieved only if the storage provider (e.g., Amazon Web Services Elastic Block Store, PortWorx, etc.) has an option to create an encrypted disk which is managed by the PV. Storage classes associated with the volumes provide an option to create a PV where data is encrypted at rest. Not all PV types and corresponding storage classes provide encryption and not all venders' solutions, as well as local volumes, have ready-made encryption available. Therefore, when working with Kubernetes persistence volumes for encryption of data at rest, applications must depend upon the underlaying storage provider offering such a functionality.

While advantages may be realized with the foregoing solutions, problems and limitations remain.

SUMMARY

Prior solutions, which create a dependency on a storage provider to offer encryption functionality, limit encryption options and curtails the opportunity to provide secure and scalable solutions. For example, encryption options may be tied to a particular storage provider; encryption may also require, and be limited to, an enterprise license to such functionality; and the encryption parameters (e.g., the particular algorithm is used, the key size, the granularity of the key, whether multiple volumes are to be encrypted with a cluster-wide key or with a per-volume key, etc.). This "one size fits all" approach limits options by forcing encryption on all contents, even when encryption is otherwise needed and by providing encryption parameters. As a result, additional processing is required to encrypt-decrypt information that could be stored as clear text and/or encryption parameters may be better suited for a particular implementation are not available. Benefits of the embodiments provided herein enable customized encryption parameters as well as a mix of encrypted/non-encrypted data to be stored on the same disk, to encrypted on the data at rest in the manner best suited for a particular use.

Some prior solutions could cause an entire virtual machine (VM) to be encrypted, this does not help since the disks that are managed by Kubernetes PV are floating disks, which can be moved from one VM to another. For example, if a Kubernetes disk is encrypted with VM1's key, and then moved to VM2, the disk could not be read by VM2.

Applications running in Kubernetes clusters use persistent volume functionality to acquire storage. Persistent volumes interact with storage providers to provision storage for containers as per the configuration. If encryption of data at rest is desired for the storage managed by the persistent volume then problems remain as not all storage provider offer such functionality; when offered, storage provider-independent means to encrypt data at rest is not available; certain storage providers that do offer at rest encryption have licensed-induced restrictions; and the prior art has no mechanism available that provides "at rest" encryption without requiring changing application code to implement such encryption. Encryption "at rest" is the encryption of data when it is persisted, such as on a disk and not during other times, such as in transit. As a benefit, an attacker or other unauthorized party with access to the disk hardware would find data encrypted. Encryption may utilize, but should not be confused with, the REST API ("RESTful" API interface provided via HTTP utilizing HTTP POST, PUT, PATCH, DELETE, and GET), the fundamental fabric of Kubernetes that supports operations and communication between components and external users and processed by the Kubernetes API server.

These and other needs are addressed by the various embodiments, aspects, and configurations disclosed herein, which may depend on the particular configuration utilized. These and other advantages will be apparent from the disclosure herein.

As a general overview, and in one embodiment, systems and methods are disclosed to encrypt disks provisioned by Kubernetes PVs. As a benefit, the shortcomings of the prior art are overcome and advancement of the current state of the art is provided, such as to elevate existing security options and changing a volume's image to include additional tool libraries comprising encryption. More specifically, embodiments described herein enable encryption at a disk-level that is independent and portable between storage vendors (and their dissimilar commands, protocols, key formats, encryption methodologies, etc.); selectively enables encryption at the data, disk, or partition level; maintain usability and encryption of a block storage volume when the volume is mounted inside a particular container and is mounted on a different node or relocated to a new container; encrypting the data on the underlying disk at rest; provide virtual machine (VM) encryption without requiring the entire VM to be encrypted and without requiring decrypting with old keys and re-encrypting with new VM keys to port the encrypted data from one VM to another VM to allow the second VM to read the data; providing application images with additional tool libraries to perform encryption; selectively encrypting a database and non-database components; performing encryption at the kernel level (applications do not need to be re-coded to include encryption); application containers may have kernel level encryption even while not running as privileged containers that would require root access; avoid re-encryption in the event of a crash and restart; and all while maintaining compliance with the encryption requirements (e.g., GDPR, CCPA, etc.). Accordingly, encryption is available without each service requiring modification and the overhead associated with having its own encryption services and, instead, a disk encryption service described with respect to the embodiments herein is provided. Other benefits may be realized, such as improved response times by having an operating system (OS) level encryption as compared to column or application level encryption. While the embodiments herein are described as utilizing Kubernetes container orchestration, and the services, features, and shortcomings provided by Kubernetes, it should be appreciated that some or all of the embodiments described herein may apply to any platform having at least the features and shortcomings of Kubernetes addressed herein.

As mentioned above, prior solutions provide encryption that may be provided to an entire disk on the storage datastore, so any data that is written on the datastore is encrypted. However, this prevents the data store from being used for both encrypted and unencrypted volumes. A storage volume may be encrypted, such as by the storage solution provider, but encryption must be defined beforehand and cannot, for example, be implemented just before launching the Pod, and at no time with a heterogeneous mixture of storage providers.

Application level encryption is also an option, but the application is then required to perform the configuration and maintenance to categorize sensitive and non-sensitive information. This affects the application's performance and may leave data vulnerable as applications may be acting as a data bus and may not have the capability to categorize the data. Therefore, such solutions rely on disk encryption for providing data at rest encryption.

In another embodiment, disk encryption is provided. The embodiments may prepare encrypted disk after the disk is attached to Pod but before the Pod is used by a specific application container by utilizing Kubernetes a mutating admission webhook (e.g., "MutatingAdmissionWebhook" as an HTTP callback utilizing an HTTP POST for event notifications, and an initialization container (e.g., "init container") functionality, that runs to completion prior to starting an associated application container containing the application. As a benefit, encryption is provided without requiring modification of application code to include encryption. As is known by those of ordinary skill in the art, Init containers and MutatingAdmissionWebhook are individually used by applications to solve different use cases (e.g., perform network management using MutatingAdmissionWebhook). Accordingly, and with respect to certain embodiments disclosed herein, a combination of encryption with MutatingAdmissionWebhook is provided to promote deployment flexibility and security and advancing the state of the art.

Kubernetes utilizes persistent objects to represent the state of a cluster of nodes. Objects are created from a specification and, as disclosed herein, objects may read and annotate the specification to self-build a platform having the desired disk encryption.

In one embodiment, systems and methods are disclosed that provide disk encryption, which may be implemented as a service. The combination of MutatingAdmissionWebhook and InitContainer encrypt a target PV and, via intelligent use of mount propagation techniques, causes the encryption of the PV from only a few annotations (e.g., metadata). The encrypted PV is then made available inside the container requesting the encrypted PV. The encryption being applied to the data at rest on the disk and presented as the encrypted target PV.

In one embodiment, a high-level process flow is provided comprising:

1. A disk encryption service that defines the MutatingAdmissionWebhook of Kubernetes to be invoked when a Kubernetes API server receives a Pod creation request for a Pod which is interested in mounting an encrypted PV. The Pod requests encryption of the PV by adding appropriate annotations to the Pod request specification utilized to build the PV.

2. The disk encryption service, such as a defined server module, responds to Webhook invocation and validates the Pod's request and confirms all the prerequisite data for PV encryption. Prerequisite data may include, but is not limited to, a PersistentVolumeClaim (PVC) is identified in the specification annotations, volumeMode is "Block" to cause the volume to be used as a raw block device, the secret (e.g., an object to hold a small amount of sensitive data) which also holds an encryption pass-phrase, and/or valid FS type (e.g., file system (FS) to use for the volume).

3. After the Pod specification is validated, the disk encryption service injects an InitContainer into the Pod specification. It also provisions additional hostPath mounts on the application container, as per the specification annotation, to specify where the encrypted disk will become available when the hostPath is mounted at the container-requested location inside the container. Kubernetes is absent host-to-container propagation, however, in another embodiment, host-to-container propagation is provided herein. For example, if the hostPath refers to host directory "hostDir-X," then the mount is created with mountPropagation=HostToContainer so any mounts on host inside hostDir-X would be reflected on container path where hostDir-X is mounted.

4. When the Pod is launched by kubelet, the init container injected by disk encryption service executes first. Init container encrypts the device pertaining to the PVC (which is to be encrypted) and then mounts the encrypted disk on a host directory. This mount is created with mountPropagation=Bidirectional so the mount from init container is reflected on host directory—hostDir-X.

5. When main app container launches, the encrypted PV is mounted in its desired path from hostDir-X.

6. Init container sets up encrypted disk and makes disk available on the underlying host. The main container simply picked up this mount from underlaying host and it received the encrypted disk.

7. When a Pod is shut down, proxy container (injected by webhook along with init container) will unmount the disk from the host path.

8. When the Pod relocates to different node, init container will detect that the disk pertaining to the PV was already encrypted and will simply validate that the disk to be opened using the secret that the Pod provided. If valid, the disk would be mounted again and made available to main container using propagation technique mentioned before.

Various benefits may be realized with respect to one or more of the embodiments, and aspects thereof, described herein, including, but not limited to: a main container did not have to determine how to encrypt the disk; the main container does not need to change any code to include encryption libraries and tools, like libgcrypt, dm-crypt, cryptsetup etc., only a couple of annotations to the Pod definition are required to be added; the main container did not need privilege escalation in order to perform formatting or mounting operations which require root access; when a Pod is moved to different node, access to the encrypted PV is maintained; and the PV type does not impact the disk encryption service, be it LocalVolume, NFS, VsphereVolume, PortWorx volume, etc. the encryption approach remains same.

Exemplary aspects are directed to:

A system, for self-configuring a self-contained executable module (Pod) utilizing encrypted data storage, comprising:

a network interconnecting components of the system for the exchange of data thereon;

at least one server with a processor and instructions for the processor in a non-transitory memory;

at least one node operable to execute an application from application instructions; and wherein a specification is accessed comprising instructions for the creation of a Pod, the Pod to comprise an application container comprising the application instructions and an encrypted data storage utilized by the application;

wherein a server of the system receives notification of the specification and, in response, further determines that the specification includes a requirement for encrypted data storage and, in response, inserts into the specification an initialization container specification comprising an encryption key, wherein the initialization container will execute prior to the execution of the application container; and wherein the at least one node executes the Pod comprising the initialization container and the application container.

A method for configuring a self-contained executable module (Pod) utilizing encrypted data storage, comprising:

accessing a Pod creation specification comprising specification instructions for the creation of a Pod, the Pod to comprise an application container comprising the application instructions and an encrypted data storage utilized by the application;

determining, by a processor, that the specification includes a requirement for encrypted data storage and, in response, automatically inserting into the specification an initialization container specification comprising an encryption key, wherein the initialization container will execute prior to the execution of the application container; and executing the Pod comprising the initialization container and the application container.

A processor, executing a service, comprising:

accessing a Pod creation specification comprising specification instructions for the creation of a Pod, the Pod to comprise an application container comprising the application instructions and an encrypted data storage utilized by the application;

determining, by the processor, that the specification includes a requirement for encrypted data storage and, in response, automatically inserting into the specification an initialization container specification comprising an encryption key, wherein the initialization container will execute prior to the execution of the application container; and executing the Pod comprising the initialization container and the application container; and wherein the service accesses encrypted data and non-encrypted data concurrently maintained on a disk comprising the encrypted data storage.

Any of the above aspects, wherein the encrypted data storage is mounted on a disk, the disk comprising encrypted data concurrently with non-encrypted data.

Any of the above aspects, wherein the encrypted data storage is mounted on a disk, the disk comprising encrypted data encrypted with the encryption key concurrently with other encrypted data encrypted with a different encryption key.

Any of the above aspects, wherein a node of the at least one node:

executes the initialization container configured with the initialization container specification; and upon completion of execution of the initialization container, executes the application container to execute the application accessing the encrypted data storage.

Any of the above aspects, wherein the initialization container executes to perform:

encryption of data on a disk hardware utilizing the encryption key;

mounting of a disk volume, for the disk hardware, at a location path defined in the specification; and wherein the application accesses the disk hardware via the disk volume.

Any of the above aspects, wherein:

the specification comprises a definition for a sidecar application comprising instructions to close the encrypted storage; and a node of the at least one node executes the application container to completion and, therefore, executes the sidecar application.

Any of the above aspects, wherein the initialization container is compliant with Kubernetes 'init container'.

Any of the above aspects, wherein the server performs operations via execution of a Kubernetes 'MutatingAdmissionWebhook'.

Any of the above aspects, wherein the Kubernetes 'MutatingAdmissionWebhook' calls a second server with a Kubernetes 'AdmissionReview' request and, in response, receives the specification for the initialization container.

Any of the above aspects, wherein:

the at least one node comprises a first node and a second node; and wherein the first node executes the Pod comprising the initialization container and the application container; and moving the Pod from the first node to the second node for execution on the second node and maintaining the encrypted data storage without performing a de-encryption and re-encryption and wherein the application code accesses the encrypted data storage as encrypted with the encryption key.

Any of the above aspects, wherein:

mounting propagation of the initialization container is bidirectional propagation;

mounting propagation for the application container is, host to container, propagation; and wherein the encrypted data storage is mounted on a disk, the disk comprising encrypted data concurrently with non-encrypted data and accessible to each of the initialization container and application container access the disk.

Any of the above aspects, wherein executing the Pod further comprises the encrypted data storage to be mounted a disk, the disk comprising encrypted data concurrently with non-encrypted data.

Any of the above aspects, wherein executing the Pod further comprises the encrypted data storage to be mounted a disk, the disk comprising encrypted data encrypted with the encryption key concurrently with other encrypted data encrypted with a different encryption key.

Any of the above aspects, further comprising:

executing the initialization container configured with the initialization container specification; and upon completion of execution of the initialization container, executing the application container to execute the application accessing the encrypted data storage.

Any of the above aspects, wherein the executing the initialization container comprises, encrypting data on a disk hardware utilizing the encryption key;

mounting of a disk volume, for the disk hardware, at a location path defined in the specification; and wherein the application accesses the disk hardware via the disk volume.

Any of the above aspects, wherein:

the specification comprises a definition for a sidecar application comprising instructions to close the encrypted storage; and upon executing the Pod comprising the initialization container and the application container to completion, executing the sidecar application.

Any of the above aspects, wherein accessing the specification comprises generating the specification from a service requesting execution of the application.

Any of the above aspects, comprising operations on a system of networked components executing within a Kubernetes platform.

A system on a chip (SoC) including any one or more of the above aspects.

One or more means for performing any one or more of the above aspects.

Any one or more of the aspects as substantially described herein.

Any of the above aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, a input-output buffer, a memory of an input-output component in communication with the processor, a network communication buffer, and a networked component in communication with the processor via a network interface.

As an aid to understanding, descriptions of certain terms used herein are provided. These descriptions are believed to be consistent with the meaning prescribed by Kubernetes (see www.kubernetes.io/docs/reference/) and are not provided as a re-definition or to impart any supplemental meaning. All terms related to the definition, specification, and operation of Kubernetes or any portion thereof, unless expressly stated otherwise, shall have the meaning herein prescribed to it by Kubernetes.

Cluster—Groupings of one or more worker machines, or "nodes" running a containerized application.

Container—an executable that contains the software and all dependences needed to execute. Container is within a Pod and has access to the volume.

Control plane—The container orchestration layer that exposes the API and interfaces to define, deploy, and manage the lifecycle of containers and includes, at least: etcd (a consistent and highly-available key value store used as Kubernetes' backing store for all cluster data), Kubernetes API server (validates and configures data for the api objects which include Pods, services, replicationcontrollers, and others. The API Server services REST operations and provides the frontend to the cluster's shared state through which all other components interact.), scheduler (a policy-rich, topology-aware, workload-specific function that significantly impacts availability, performance, and capacity), controller manager (a daemon that embeds the core control loops shipped with Kubernetes and is a control loop that watches the shared state of the cluster through the apiserver and makes changes attempting to move the current state towards the desired state. Examples of controllers that ship with Kubernetes today are the replication controller, endpoints controller, namespace controller, and serviceaccounts controller.), and cloud controller manager (a component that embeds cloud-specific control logic. The cloud controller manager lets cluster be linked into a cloud provider's API, and separates out the components that interact with that cloud platform from components that just interact with the cluster.).

Disk—physical hardware utilized to store data. Usage of the singular "disk" is non-limiting and may include one or more physical, non-transitory, storage devices and/or medium.

Kubelet—the primary node agent" that runs on each node. It can register the node with the apiserver using one of: the hostname; a flag to override the hostname; or specific logic for a cloud provider. The kubelet works in terms of a PodSpec. A PodSpec is a YAML or JSON object that describes a Pod. The kubelet takes a set of PodSpecs that are provided through various mechanisms (primarily through the apiserver) and ensures that the containers described in those PodSpecs are running and healthy. The kubelet does not manage containers which were not created by Kubernetes.

Node—A node is a physical machine or virtual machine (i.e., a physical machine(s) presented as a different machine) as determined by the cluster. Each node contains the services necessary to run Pods that are managed by the control plane.

Mutating Admission Webhook (or "MutatingAdmissionWebhook")—an HTTP callback that is one type of admission controller, code that intercepts requests to the Kubernetes API server prior to the persistence of the object, but after the request is authenticated and authorized. Mutating controllers may modify the object they admit, while "validating" controllers may not. Some controllers may be validating, mutating, or both. In a first phase of admission control, a mutating phase allows the object to be modified and, in a second validating phase, validations are performed, although some controllers are mutating and validating. MutatingAdmissionWebhook can only run during the mutating phase.

Persistent volumes—(also known as "PersistentVolume" or "PV") storage in a cluster, which may be provisioned by an administrator or dynamically.

Persistent Volume Claim—(also known as: "PersistentVolumeClaim" or "PVC") a request for storage by a user. May define types (e.g., mounted as a single or multiple read/write), PVCs consume PV (like Pods consume resources).

Pod—The most granular execution unit in Kubernetes. A Pod represents a set of running containers on a cluster. Generally a Pod will have only one container therein. However, multiple containers that are tightly coupled may be within the same Pod, such as a sidecar container, that share storage and/or networks. May have a volume for storage, a file puller to access content in a content manager, and a web server to face customers. Generally containers, not Pods, are created by users. Pods themselves are not persistent. When a process ends, the Pod is terminated (termination kills the volume as well).

Init Containers (or "InitContainers") are specialized containers that run before app containers in a Pod. Init Containers can contain utilities or setup scripts not present in an app image. Init Containers always run to completion and each Init Container must complete successfully before the next Init Container starts.

Sidecar container—A Pod might encapsulate an application composed of multiple co-located containers that are tightly coupled and need to share resources. For example, these co-located containers might form a single cohesive unit of service—one container serving files from a shared volume to the public, while a separate "sidecar" container refreshes or updates those files. The Pod wraps these containers and storage resources together as a single manageable entity.

Volume—Storage within a Pod. May be a directory on disk or in another container. There may be data stored within a volume. A "volume type" determines the creation, medium that backs it, and the contents and may include awsElasticBlockStore, portworxVolume. etc. The storage medium of an "emptyDir" is determined by the medium of the filesystem holding the Kublelet root directory (typically/var/lib/kubelet).

Webhook—an HTTP callback and HTTP POST that occurs when something happens (e.g., event notification). The HTTP POST is a message to a URL.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIGS. 4A-E depict a Pod specification in accordance with embodiments of the present disclosure.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
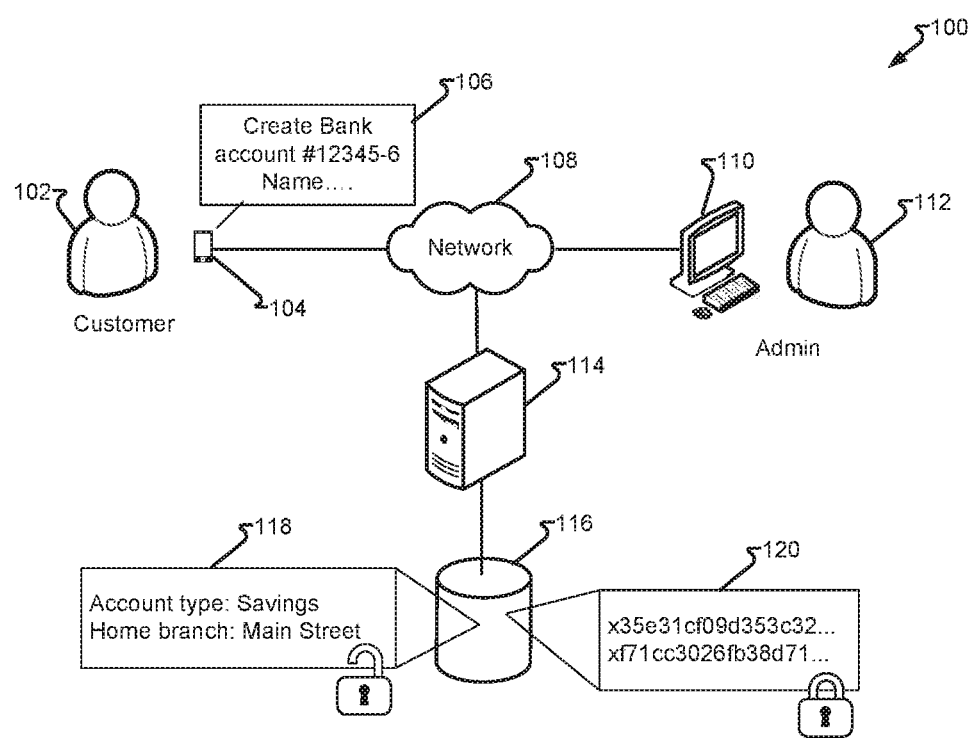
FIG. 1 depicts a first system in accordance with embodiments of the present disclosure.

FIG. 1 depicts system 100 in accordance with embodiments of the present disclosure. System 100 illustrates one network topology, however, it should be appreciated that other network topologies may be utilized without departing from the scope of the embodiments herein. Similarly, while single components are illustrated, such as computing platform 114 and data storage 116, a plurality of such components, or combinations of components may be utilized. For examples, storage may be provided by data storage 116 embodied on a number of storage platforms operated by one or more storage providers. Similarly, computing, communication, and other services may be provided by computing platform 114, having a network interface (not shown) to customer communication device 108 and nodes connected thereon, which may also comprise a number of computing hardware and hardware platforms. In a further embodiment, one or more of computing platform 114 and/or data storage 116 are deployed on a "cloud" platform wherein the underlying hardware (e.g., processing hardware, storage media, connectivity components, etc.) may be dynamically allocated, such as to accommodate variations in demands for such hardware for a single client (e.g., an enterprise providing a service). Alternate topologies may include, but are not limited to, network 108 being utilized to interconnect components of computing platform 114, data storage 116, and/or other components.

In one embodiment, administrator 112 using administrator device 110 directly, or by launching an automated process, creates or causes to be created, a Pod creation request having a label indicating disk encryption is requested, for example: "av-csp-disk-encryption: true", as well as any other labels required for persistent volume (PV) creation. The request is sent to a server, such as computing platform 114 operating as a Kubernetes API server. Computing platform 114 creates an AdmissionReview request, as is known in Kubernetes, with the Pod details and sends the request to a disk encryption service Pod, which in one embodiment, is executed by computing platform 114, such as a webhook (see FIG. 2, MutatingAdmissionWebhook 204).

Next the mutated AdmissionReview request is mutated by a disk encryption service Pod, wherein the Pod has appended thereto (e.g., "decorated") an encryption sidecar data structure and init container details, sent back to the Kubernetes API server. The sidecar data executes upon completion of the application container to close the disk.

Figure 2A:
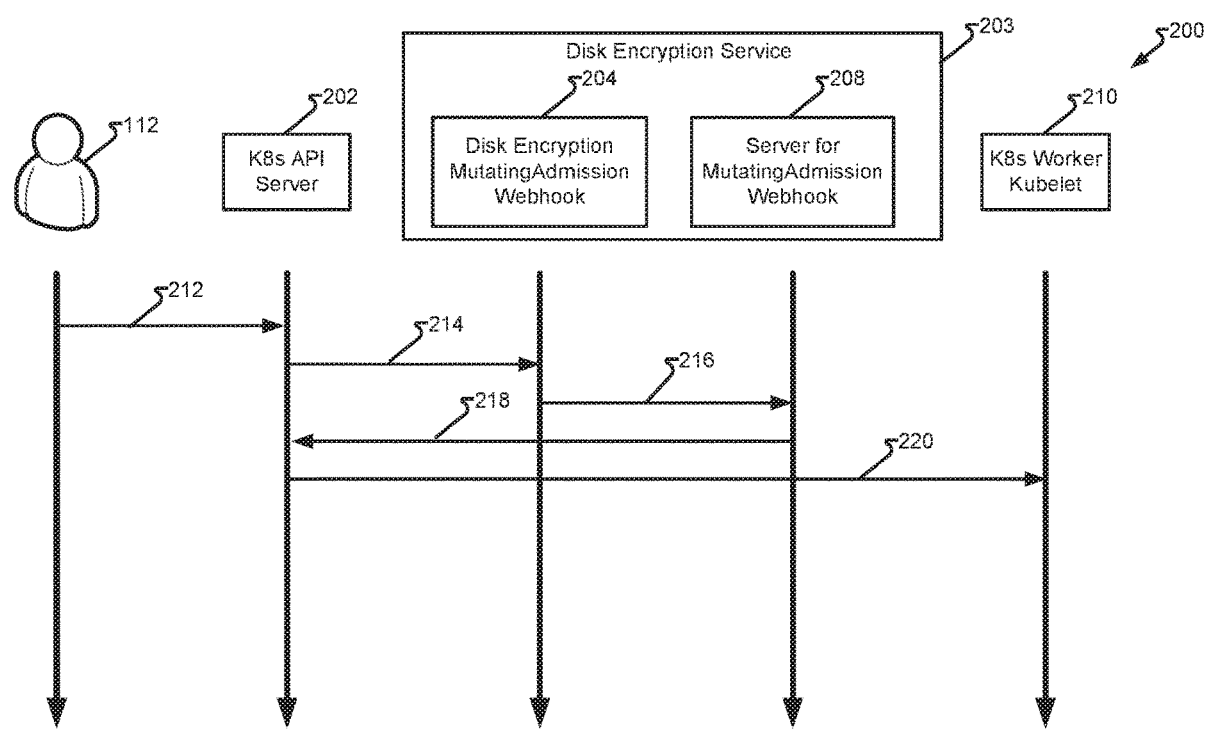
FIGS. 2A-C depict a first process in accordance with embodiments of the present disclosure.
Figure 2B:
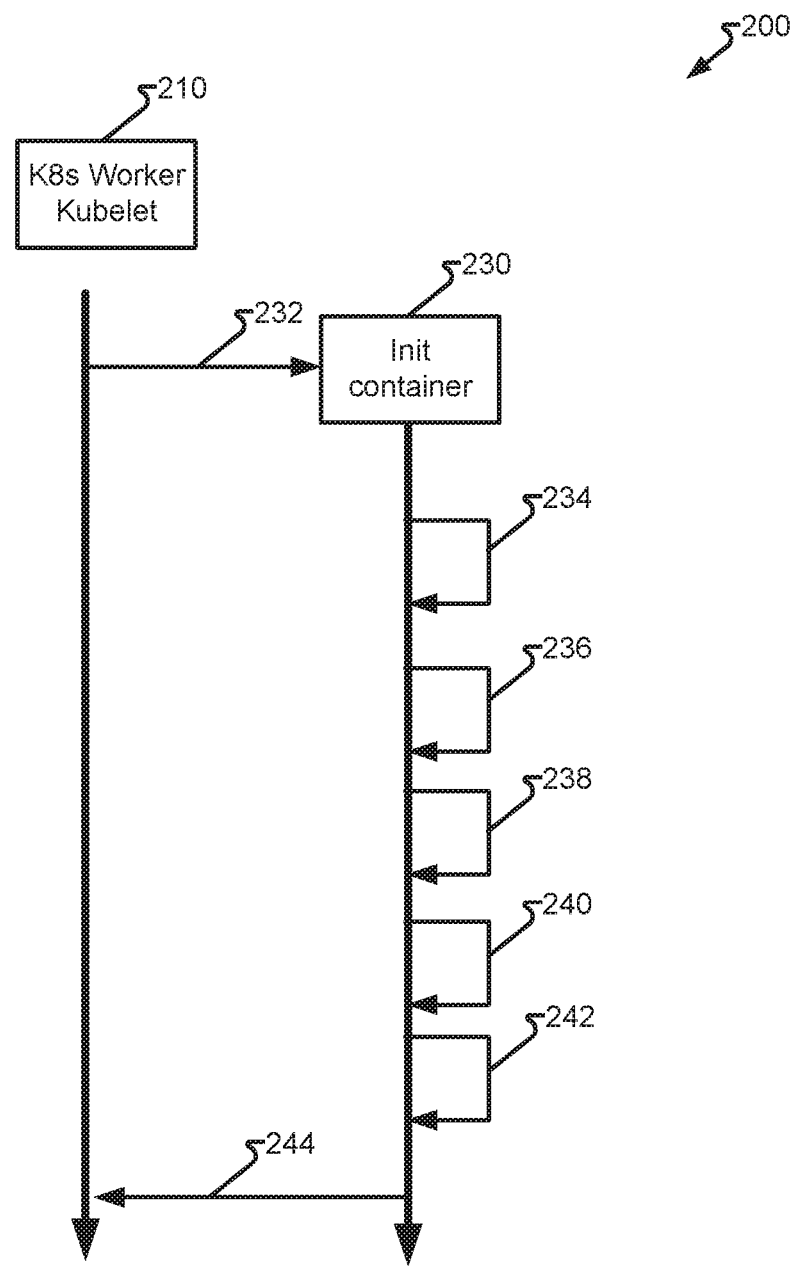
Figure 2C:
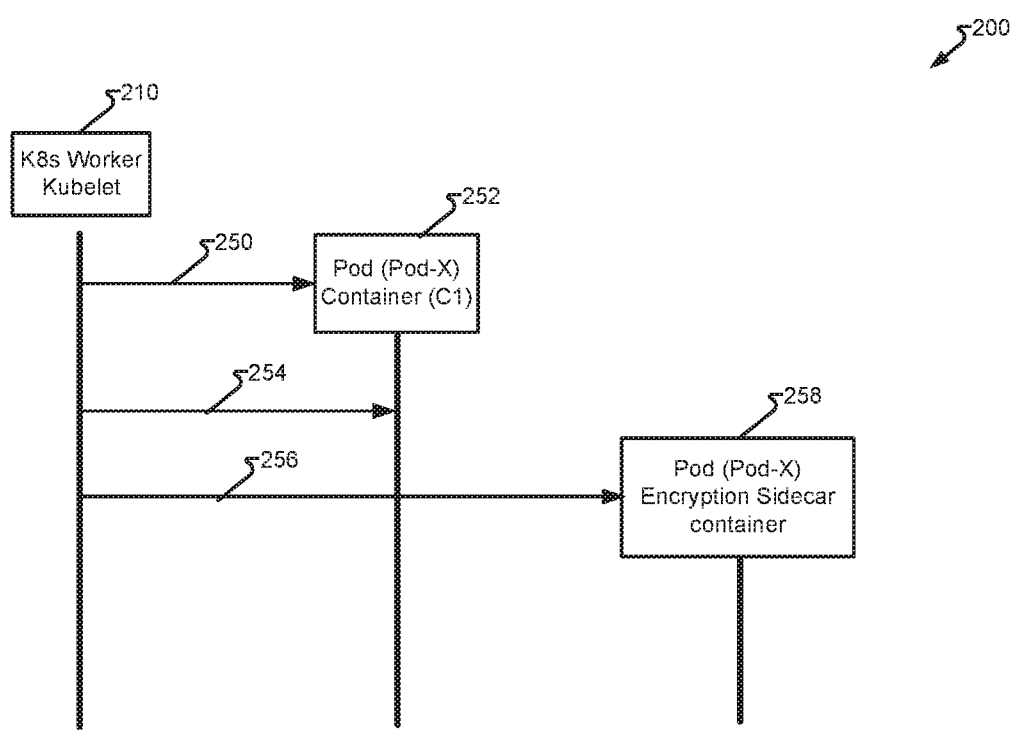

FIGS. 2A-C depict process 200 in accordance with embodiments of the present disclosure. In one embodiment, process 200 creates an executing Pod with an encrypted disk. In step 212, administrator 112 via administrator device 110 creates and deploys a Pod, the Pod comprises a request for a PV with encryption. In a further embodiment, the step 212 may be packaged in a collection of files, such as a "chart" by "Helm" and describe a set of related Kubernetes resources (e.g., the Pod, container, request for encrypted PV, etc.). The Kubernetes (shortened in the figures to "K8s") application programming interface (API) server 202 receives the chart, if utilized, or the components if no chart is utilized.

Next, in step 214, Kubernetes API server 202 prepares the Pod (e.g., "Pod-X") specification request and forwards the Pod specification with the container (e.g., "C1") requesting the PV to MutatingAdmissionWebHook 204. In step 216 Disk encryption MutatingAdmissionWebHook 204 provides Kubernetes AdmissionReview request to server (catering for MutatingAdmissionWebhook 208.

In step 218, server for MutatingAdmissionWebhook 208 provides Kubernetes AdmissionReview response, for the Pod (e.g., "Pod-X") with a specification for an init container and sidecar container. In step 220, Kubernetes API server 202 creates the Pod (e.g., "Pod-x") with the container having therein, the request for the encrypted PV to be mounted in the path specified by server for MutatingAdmissionWebhook 208, for example, "/container-path/somepath".

Next, at step 232, Kubernetes worker kubelet 210 starts encryption init container 230, init container executes and performs steps 234, 236, 238, 240, and 242. More specifically, step 234 access the block device, step 236 reads the secret to fetch the disk encryption key, step 238, encrypts the block device using the encryption key, step 240 maps the block device as the disk, and step 242 mounts the disk on worker host path (e.g., "/host-node-path/P"). Step 244 signals Kubernetes worker kubelet 210 that init container is complete.

Kubernetes worker kubelet 210 starts the container (e.g., "C1") at step 250 and, at step 254, mounts the PV from the hostpath (e.g., "/host-node-path/P") to the container path (e.g., "/container-path/somepath"). In Step 256 kubelet 210 instantiate the encryption sidecar container 258 with in the pod. Upon completion of step 256, the Pod is executing with an encrypted disk and ready for use.

Figure 3:
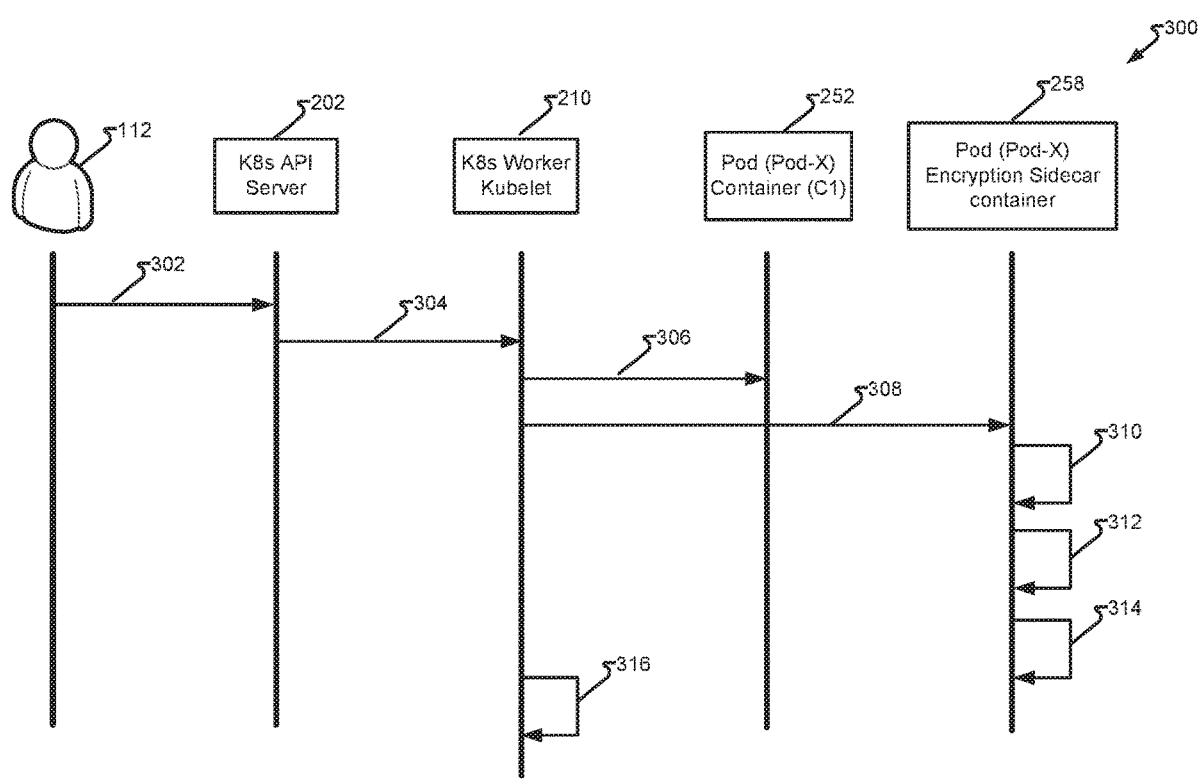
FIG. 3 depicts a second process in accordance with embodiments of the present disclosure.
Figure 4D:
Figure 4E:
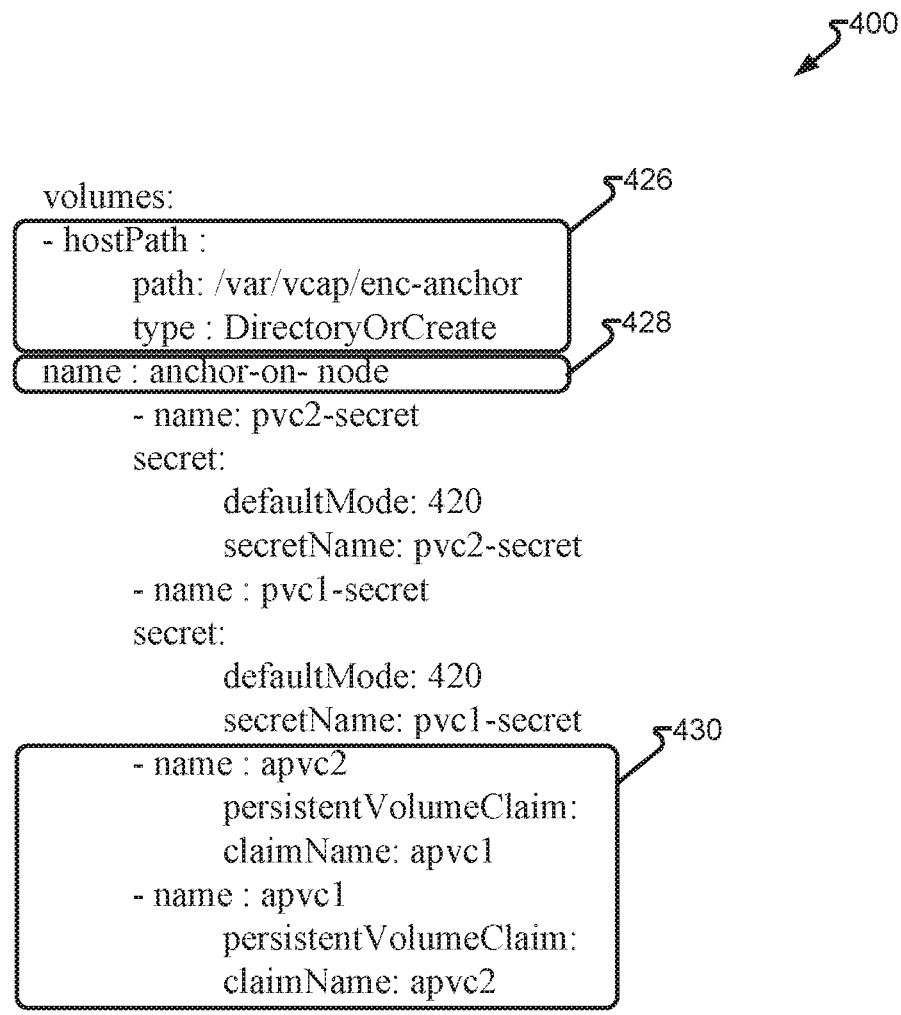

FIG. 3 depicts process 300 in accordance with embodiments of the present disclosure. In one embodiment, process 300 is initiated, such as by administrator 112, via administrator device 110, to terminate a Pod, such as "Pod-X" created by process 200. When step 212 (see FIG. 2A)

utilizes chart in step 212, step 302 may similarly be a request to delete the corresponding chart. Kubernetes API server 202 receives the deletion request (step 302), and sends a Pod termination request to Kubernetes worker kubelet 210 in step 304. Kubernetes worker kubelet 210 sends a stop and terminate the container in steps 306, to Pod with container 252, and to Pod with encryption sidecar container 258, in step 308.

Pod with encryption sidecar container 258 then executes steps 310, 312, and 314. Step 310 invokes a cleanup script, step 312 unmounts the disk from the hostpath (e.g., "/host-node-path/P"), and step 314 closes the encrypted disk. At step 316, Kubernetes worker kubelet 210 has completed the Pod termination request.

FIGS. 4A-E depict Pod specification 400 in accordance with embodiments of the present disclosure. In one embodiment, Pod specification 400 illustrates one example of instructions provided for execution, by one or more processors to utilize MutatingAdmissionWebhook and init container of Kubernetes, to provide a persistent volume having encryption at rest. In one embodiment, Pod specification 400 comprises annotation block 402 of the Pod and the request to create a persistent volume (PV) for processing by the MutatingAdmissionsWebhook. In one embodiment, block 404 defines the name of a Kubernetes container (e.g., "container1"), a persistent volume claim, (e.g., "apvc1"), and a mount path (e.g., "/var/my-path1").

Next block 410 defines the init container to be created by the Kubernetes API server (e.g., Kubernetes API server 202). Block 412 (e.g., "bidirectional") which causes the volume mount created by the container (e.g., "container1") to be propagated back to the host (e.g., defined by HostPath) and to all containers from the Pod that use the same volume. The init container mounts to a corresponding directory in the host as well. Block 416, identified in block 404, defines the container for container creation by MutatingAdmissionWebhook (e.g., MutatingAdmissionWebhook 208) to have the path defined in block 408 added in block 418. Block 420 specifies that the volume mounted in the host directory will be mounted in the container as well at the subpath provided in block 422, as defined in annotation block 406.

Block 424 defines the sidecar container to be injected by MutatingAdmissionWebhook (e.g., MutatingAdmissionWebhook 208).

The hostpath where the PV is mounted by init container (e.g., init container 230) specified in block 426 including block 428 (e.g., "anchor-on-node" defined in block 413, and block 430 are the volumes added to the Pod spec defined in the pvc-info annotation block 402.

Figure 5:
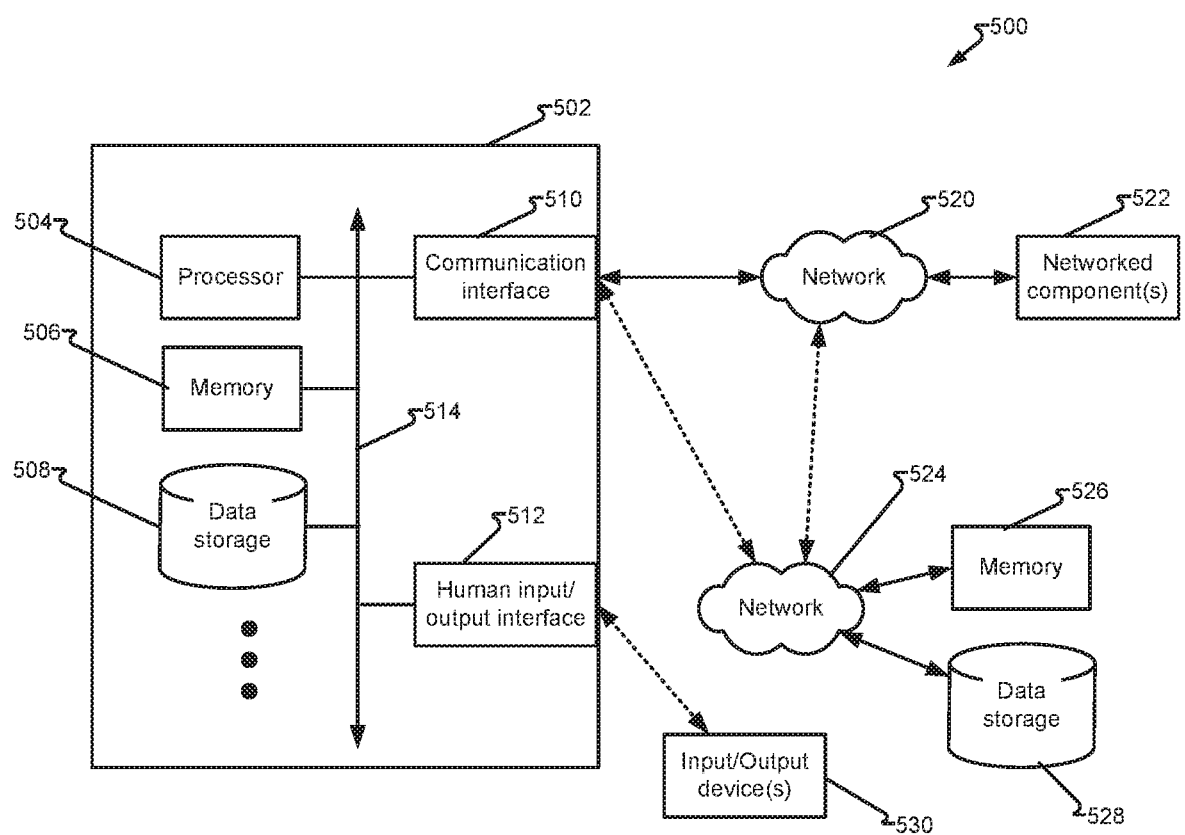
FIG. 5 depicts a second system in accordance with embodiments of the present disclosure.

FIG. 5 depicts device 502 in system 500 in accordance with embodiments of the present disclosure. In one embodiment, computing platform 114 may be embodied, in whole or in part, as device 502 comprising various components and connections to other components and/or systems. The components are variously embodied and may comprise processor 504. Processor 504 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 514, executes instructions, and outputs data, again such as via bus 514. In other embodiments, processor 504 may comprise a shared processing device that may be utilized by other processes and/or process owners, such as in a processing array or distributed processing system (e.g., "cloud", farm, etc.). It should be appreciated that processor 504 is a non-transitory computing device (e.g., electronic machine comprising circuitry and connections to communicate with other components and devices). Processor 504 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor (e.g., processor 504) and the hardware and other circuitry thereof.

In addition to the components of processor 504, device 502 may utilize memory 506 and/or data storage 508 for the storage of accessible data, such as instructions, values, etc. Communication interface 510 facilitates communication with components, such as processor 504 via bus 514 with components not accessible via bus 514. Communication interface 510 may be embodied as a network port, card, cable, or other configured hardware device. Additionally or alternatively, human input/output interface 512 connects to one or more interface components to receive and/or present information (e.g., instructions, data, values, etc.) to and/or from a human and/or electronic device. Examples of input/output devices 530 that may be connected to input/output interface include, but are not limited to, keyboard, mouse, trackball, printers, displays, sensor, switch, relay, etc. In another embodiment, communication interface 510 may comprise, or be comprised by, human input/output interface 512. Communication interface 510 may be configured to communicate directly with a networked component or utilize one or more networks, such as network 520 and/or network 524.

Network 108 may be embodied, in whole or in part, as network 520. Network 520 may be a wired network (e.g., Ethernet), wireless (e.g., WiFi, Bluetooth, cellular, etc.) network, or combination thereof and enable device 502 to communicate with network component(s) 522. In other embodiments, network 520 may be embodied, in whole or in part, as a telephony network (e.g., public switched telephone network (PSTN), private branch exchange (PBX), cellular telephony network, etc.)

Additionally or alternatively, one or more other networks may be utilized. For example, network 524 may represent a second network, which may facilitate communication with components utilized by device 502. For example, network 524 may be an internal network to a business entity or other organization, whereby components are trusted (or at least more so) that networked components 522, which may be connected to network 520 comprising a public network (e.g., Internet) that may not be as trusted.

Components attached to network 524 may include memory 526, data storage 528, input/output device(s) 530, and/or other components that may be accessible to processor 504. For example, memory 526 and/or data storage 528 may supplement or supplant memory 506 and/or data storage 508 entirely or for a particular task or purpose. For example, memory 526 and/or data storage 528 may be an external data repository (e.g., server farm, array, "cloud," etc.) and allow device 502, and/or other devices, to access data thereon. Similarly, input/output device(s) 530 may be accessed by processor 504 via human input/output interface 512 and/or via communication interface 510 either directly, via network 524, via network 520 alone (not shown), or via networks 524 and 520. Each of memory 506, data storage 508, memory 526, data storage 528 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 530 may be a router, switch, port, or other communication component such that a particular output of processor 504 enables (or disables) input/output device 530, which may be associated with network 520 and/or network 524, to allow (or disallow) communications between two or more nodes on network 520 and/or network 524. For example, a connection between one particular customer, using a particular customer communication device 104, may be enabled (or disabled) with a particular networked component 522 Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, for self-configuring a self-contained executable module (Pod) utilizing encrypted data storage, comprising:
a network interconnecting components of the system for exchange of data thereon;
at least one server with a processor; and
a computer-readable medium coupled to the processor, the computer-readable medium comprising one or more computer readable instructions, the processor executing the one or more computer readable instructions to execute at least one node;
the at least one node operable to execute an application from application instructions; and
wherein a specification is accessed comprising instructions for creation of a Pod, the Pod to comprise an application container comprising the application instructions and an encrypted data storage utilized by the application;
wherein a server of the system receives notification of the specification and, in response to receiving the notification, further determines that the specification includes a requirement for encrypted data storage and, in response to the further determination, inserts into the specification an initialization container specification for an initialization container comprising an encryption key, wherein the initialization container will execute prior to the execution of the application container;
wherein the at least one node executes the Pod comprising the initialization container and the application container; and
wherein the at least one node executes the initialization container configured with the initialization container specification to perform encryption of data on a disk hardware utilizing the encryption key, mounting of a disk volume, for the disk hardware, at a location path defined in the specification and upon completion of execution of the initialization container, and executes the application container to execute the application accessing the encrypted data storage at such disk hardware via the disk volume.

2. The system of claim 1, wherein the encrypted data storage is mounted on the disk hardware comprising encrypted data concurrently with non-encrypted data.

3. The system of claim 1, wherein the encrypted data storage is mounted on the disk hardware comprising encrypted data encrypted with the encryption key concurrently with other encrypted data encrypted with a different encryption key.

4. The system of claim 1, wherein:
the specification comprises a definition for a sidecar application comprising instructions to close the encrypted data storage; and
a node of the at least one node executes the application container to completion and, therefore, executes the sidecar application.

5. The system of claim 1, wherein the initialization container is compliant with Kubernetes 'init container'.

6. The system of claim 1, wherein the server performs operations via execution of a Kubernetes 'MutatingAdmissionWebhook'.

7. The system of claim 6, wherein the Kubernetes 'MutatingAdmissionWebhook' calls a second server with a Kubernetes 'AdmissionReview' request and, in response, receives the specification for the initialization container.

8. The system of claim 1, wherein:
the at least one node comprises a first node and a second node; and
wherein the first node executes the Pod comprising the initialization container and the application container; and
moving the Pod from the first node to the second node for execution on the second node and maintaining the encrypted data storage without performing a de-encryption and re-encryption and wherein code of the application accesses the encrypted data storage as encrypted with the encryption key.

9. The system of claim 1, wherein:
mounting propagation of the initialization container is bidirectional propagation;
mounting propagation for the application container is, host to container, propagation; and wherein the encrypted data storage is mounted on the disk hardware comprising encrypted data concurrently with non-encrypted data and accessible to each of the initialization container and application container access the disk hardware.

10. The processor of claim 1, wherein the server performs operations via execution of a Kubernetes 'MutatingAdmissionWebhook'.

11. The processor of claim 10, wherein the Kubernetes 'MutatingAdmissionWebhook' calls a second server with a Kubernetes 'AdmissionReview' request and, in response, receives the specification for the initialization container.

12. A method for configuring a self-contained executable module (Pod) utilizing encrypted data storage, comprising:
accessing a Pod creation specification comprising specification instructions for creation of a Pod, the Pod to comprise an application container comprising application instructions for an application and an encrypted data storage utilized by the application;
determining, by a processor, that the Pod creation specification includes a requirement for encrypted data storage and, in response to determining that the Pod creation specification includes the requirement, automatically inserting into the Pod creation specification an initialization container specification for an initialization container comprising an encryption key, wherein the initialization container will execute prior to execution of the application container;
executing the Pod comprising the initialization container and the application container;
executing the initialization container configured with the initialization container specification; and
wherein the initialization container is configured with the initialization container specification to perform encryption of data on a disk hardware utilizing the encryption key, mounting of a disk volume, for the disk hardware, at a location path defined in the Pod creation specification and upon completion of execution of the initialization container, and executing the application container to execute the application accessing the encrypted data storage at such disk hardware via the disk volume.

13. The method of claim 12, wherein executing the Pod further comprises mounting the encrypted data storage to the disk hardware comprising encrypted data concurrently with non-encrypted data.

14. The method of claim 12, wherein executing the Pod further comprises mounting the encrypted data storage to the disk hardware comprising encrypted data encrypted with the encryption key concurrently with other encrypted data encrypted with a different encryption key.

15. The method of claim 12, wherein:
the Pod creation specification comprises a definition for a sidecar application comprising instructions to close the encrypted data storage; and
upon executing the Pod comprising the initialization container and the application container to completion, executing the sidecar application.

16. The method of claim 12, wherein accessing the Pod creation specification comprises generating the Pod creation specification from a service requesting execution of the application.

17. The method of claim 12, comprising operations on a system of networked components executing within a Kubernetes platform.

18. A processor, executing a service, comprising:
accessing a Pod creation specification comprising specification instructions for creation of a Pod, the Pod to comprise an application container comprising the application instructions and an encrypted data storage utilized by the application instructions;
determining, by the processor, that the Pod creation specification includes a requirement for encrypted data storage and, in response, automatically inserting into the Pod creation specification an initialization container specification for an intialization container comprising an encryption key, wherein the initialization container will execute prior to the execution of the application container; and
executing the Pod comprising the initialization container and the application container; and
wherein the service accesses encrypted data and non-encrypted data concurrently maintained on a disk comprising the encrypted data storage; and
wherein the processor executes the initialization container configured with the initialization container specification to perform encryption of data on a disk hardware utilizing the encryption key, mounting of a disk volume, for the disk hardware, at a location path defined in the Pod creation specification and upon completion of execution of the initialization container, and executes the application container to execute the application instructions accessing the encrypted data storage at such disk hardware via the disk volume.

19. The processor of claim 18, wherein:
the Pod creation specification comprises a definition for a sidecar application comprising instructions to close the encrypted data storage; and
a node of at least one node executes the application container to completion and, therefore, executes the sidecar application.

20. The processor of claim 18, wherein the initialization container is compliant with Kubernetes 'init container'.

* * * * *